Feb. 2, 1960 E. S. WILSON 2,923,821

NOISE DISCRIMINATION CIRCUIT

Filed Dec. 5, 1957

INVENTOR

Edward S. Wilson

BY Sughrue & Rothwell

ATTORNEYS

United States Patent Office 2,923,821

Patented Feb. 2, 1960

2,923,821

NOISE DISCRIMINATION CIRCUIT

Edward S. Wilson, Poughkeepsie, N.Y., assignor to International Business Machines Corporation, New York, N.Y., a corporation of New York Application December 5, 1957, Serial No. 700,849

10 Claims. (Cl. 250—27)

This invention relates to a circuit for discriminating between pulses of different energy levels and more particularly to a circuit for discriminating between signal pulses and noise pulses.

In reading out information stored in a storage medium, it is necessary to insure that the utilization system to which the information is fed receives only signal pulses and not noise pulses. To accomplish this objective, it is necessary to feed the information from the reading device through a discriminator which functions to permit entry of signal information to the utilization system while at the same time substantially preventing entry of noise thereto which might occur during the reading operation. The discriminator of this invention functions on an energy level basis, that is, it blocks pulses having a voltage-time integral below a selected level while passing pulses having a voltage-time integral above this level. This integral of a pulse is a measure of its energy content or level.

The basic component of the discriminator of this invention is a magnetic core. A magnetic core exhibits a magnetization loop characteristic whereby only pulses having greater than a critical energy level or voltage-time integral will switch the core from one state of remanence to the other. The critical energy level necessary to switch the core may be called its switching energy level. Those that are not of sufficient energy level will not switch the core. By properly biasing the core at a point of negative remanence and substantially at negative saturation, those pulses having an energy level less than the critical level and fed to a coil wound on the core will be confronted by a very high coil impedance. Those pulses having an energy level greater than the critical level will initially be confronted by high coil impedance but as soon as the critical level has been exceeded the core will be switched and the impedance of the coil will drop substantially. A load impedance operatively connected to the coil to share with the coil the energy of the pulse will have developed thereacross an output voltage. This voltage will be relatively large or relatively small in magnitude depending upon the impedance of the coil. The impedance of the coil in turn depends upon whether or not the energy level of the input pulse is sufficient to switch the core.

It is therefore an object of this invention to provide a circuit for discriminating between pulses of different energy levels and more particularly for discriminating between signal and noise pulses.

Other and further objects of the present invention will be obvious from a detailed description of the accompanying drawings.

Figures 1, 2:
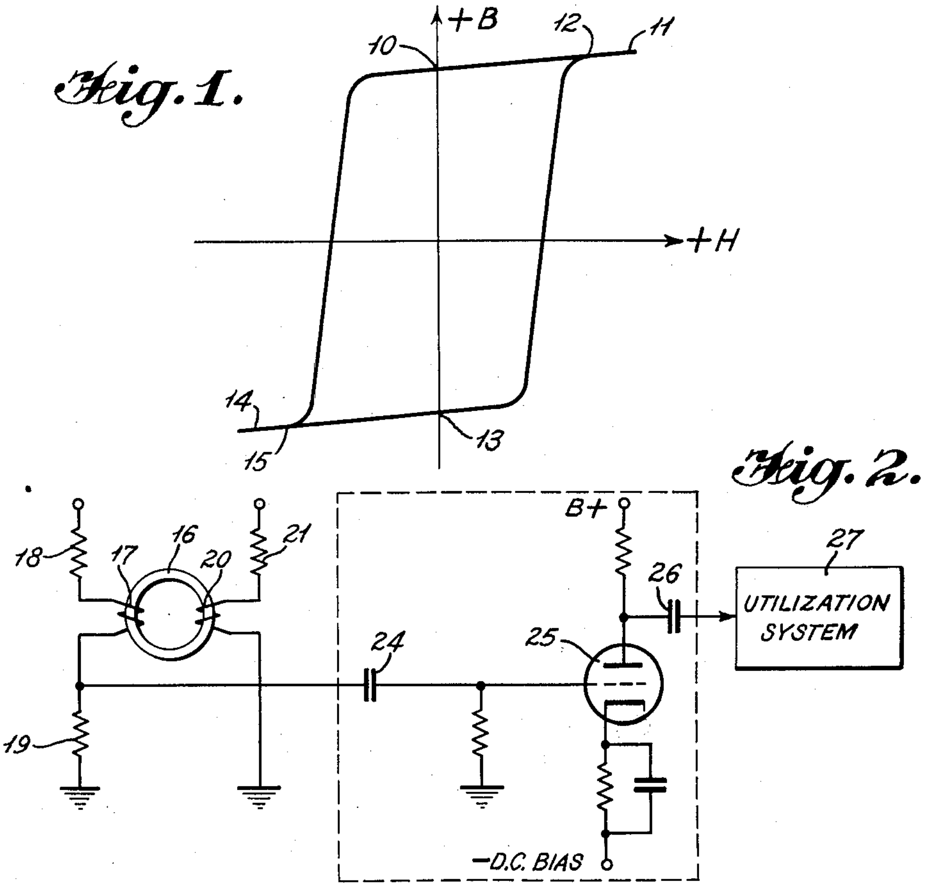
Fig. 1 illustrates the magnetization loop characteristic of the core material as utilized in the present invention.
Fig. 2 is a circuit diagram showing the discriminating circuit of this invention.

Referring to Fig. 1, it will be seen that the magnetic saturable core of this invention has a substantially rectangular hysteresis characteristic or magnetization loop. The ordinate of the graph represents field strength (B) in Gausses and the abscissa represents magnetomotive force (H) in Gilberts. Point 10 (+B*r*) represents a point of plus remanence, point 11 (+B*s*) represents plus saturation, point 12 represents a point between +B*r* and B*s*, point 13 (—B*r*) a point of negative remanence, point 14 (—B*s*) negative saturation and point 15 a point between —B*s* and —B*r*.

Referring also to Fig. 2, numeral 16 represents a magnetic saturable core. This core may be made of a variety of different materials. A material known as Othonal is satisfactory. The core is shown as toroidal in shape and may be of other configurations with either a closed or an open path. A signal input winding 17 is wound about the core. To one end of the winding 17 is connected a signal input lead 18. To the other end is connected a load impedance illustrated as a resistor 19. The other end of the load impedance 19 may be grounded. A source of D.C. bias (not shown) connects coil 20, the biasing core, to a biasing voltage through dropping resistor 21. The other end of coil 20 may be grounded.

Let us now assume that sufficient biasing current flows tthrough the turns of winding 20 to bias the core to point 14 (—B*s*). Let us further assume that the voltage-time integral or energy level necessary to switch the core from point 14 to point 12 is 300 volt-microseconds. Pulses of lesser energy levels will not switch the core. With this in mind, let us turn to Figs. 3, 4 and 5.

Figure 3:
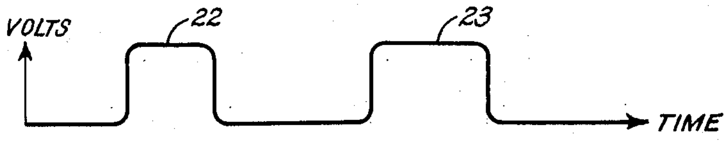
Figs. 3, 4 and 5 illustrate wave forms of voltages at various points in the circuit of this invention.

Referring first to Fig. 3, numeral 22 indicates a pulse of 15 volts amplitude and 10 microseconds duration, therefore having a voltage-time integral of 150 microseconds. Numeral 23 indicates a pulse of 15 volts amplitude and 25 microseconds duration, therefore having a voltage-time integral of 375 volt microseconds. When pulse 22 is fed to coil 17 by input lead 18 it will not switch the core and will merely move the operating point on the hysteresis curve of Fig. 2 from point 14 to a point in the neighborhood of point 13 and leave the core still in negative remanence. This being the case the coil reflects a high impedance and most of the pulse energy of pulse 22 is absorbed by it. Pulse 23 will switch the core and the operating point on the hysteresis curve will move to point 12, plus remanence, after 20 microseconds (indicated at T*s*) and drive the core to saturation, point 11 (+B*s*) thereafter. Upon the switching of the core the impedance of the coil suddenly changes from a high value to a low value. In a condition of low impedance most of the pulse energy is absorbed by the load impedance and very little by the coil.

Figure 4:
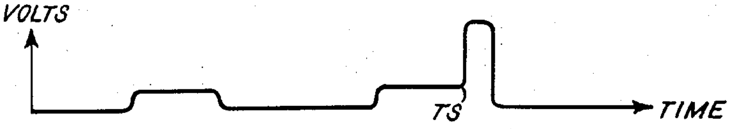

Fig. 4 illustrates the waveform of the voltage developed across the load impedance 19 as a result of the introduction of pulses 22 and 23 to coil 17. Pulse 22, because it finds the coil offering a high impedance, develops across impedance 19 only a small voltage which we will arbitrarily say is in the neighborhood of about 2 volts. When pulse 23 is fed to the coil it too finds the coil initially offering high impedance until the pulse has introduced the critical quantity of energy to the system, that is 300 volt microseconds. Therefore 20 microseconds after the leading edge of pulse 23 at a time indicated by T*s*, the core is switched and the impedance of the coil drops. Most of the voltage then appears across load impedance 19 and the amplitude of the voltage rises from about 2 volts prior to time T*s* to about 15 volts. It remains at 15 volts until the pulse 23 expires and then drops back to its original value. The core returns to negative saturation at point 14 under the influence of the biasing current through winding 20.

Figure 5:
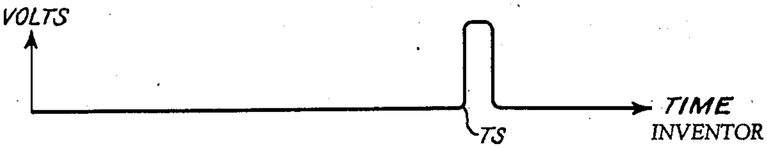

The voltage developed across resistor 19 is fed through condenser 24 to a clipping stage which is, for illustration purposes, shown as a class C amplifier biased at some voltage (for example −3 volts) at least as large as the amplitude of the voltage developed across 19 by pulse 22 and less than the voltage developed thereacross by pulse 23. Tube 25 is normally non-conducting and will not conduct unless the amplitude of the signal fed to its grid is greater than −3 volts. This means that no output is fed through condenser 26 to the utilization system 27 by pulse 22. There will be a pulse output to system 27 after time T*s* of pulse 23. Fig. 5 illustrates the output wave form of the pulse from tube 25 to the utilization system 27.

While there has been illustrated the case of positive pulses being fed to a core biased to negative saturation, it is equally true that negative pulses fed to a core biased to positive saturation will be subjected to the same discriminating action. The polarity of saturation is a function of the direction of current flow through the windings of the biasing coil 20.

Noise pulses may be of the same amplitude as signal pulses but are of much shorter pulse duration. Noise pulses do not contain sufficient energy to switch the core. The voltage-time integral necessary for switching may be varied by changing the physical dimensions of the core and the material of the core, the biasing current and the number of turns of the input winding 17 and the bias winding 20. This bias winding may be eliminated by allowing a steady state current to flow through the signal input winding 17. The important thing is that the voltage-time integral or energy level necessary to switch the core must be greater than that supplied by noise pulses and less than that supplied by signal pulses.

Tests have been made using a core of Othonal with a cross section of .0935 square inch and a pulse height of 35 volts. The time required to switch this core could be varied from 10 to 100 microseconds. A core of smaller cross section covers the same range of switching time at a 15 volt level.

What has been disclosed is one embodiment of the present invention. Other embodiments obvious from the teachings herein to those skilled in the art are contemplated to be within the spirit and scope of the following claims.

What is claimed is:

1. A circuit for discriminating between first pulses having an energy level less than a critical energy level and second pulses having an energy level at least equal to said critical level that comprises a magnetic core having switching energy level substantially equal to said critical level, means to bias said core to a state of substantial saturation, a signal input coil associated with said core to receive said pulses, a load impedance operatively connected to said coil for developing output signals thereacross, a signal clipping circuit, means to feed said output signals to said clipping circuit, said clipping circuit having a signal clipping amplitude level greater than the amplitude level of output signals fed thereto due to said first pulses and less than that of said output signals fed thereto due to said second pulses, whereby an output from said clipping circuit is obtained only when said second pulses are fed to said signal input winding.

2. A circuit as defined by claim 1 in which said biasing means includes a biasing coil on said core and means to feed a biasing current to said core.

3. A circuit as defined by claim 1 wherein said load impedance is a resistive impedance.

4. A circuit as defined by claim 1 wherein said load impedance is series connected to said coil.

5. A circuit as defined by claim 1 wherein said signal input coil is wound on said core.

6. A circuit as defined by claim 2 wherein said biasing current feeding means comprises means to feed a continuous steady state D.C. current to said biasing coil.

7. A circuit for discriminating between first pulses having an energy level less than a critical energy level and second pulses having an energy level at least equal to said critical level that comprises a magnetic core having switching energy level substantially equal to said critical level, means to bias said core to a state of substantial saturation, a signal input coil associated with said core to receive said pulses, a load impedance operatively connected to said coil for developing output signals thereacross and means to discriminate between signals developed across said impedance by said first and second pulses.

8. A circuit as defined by claim 7 in which said biasing means includes a biasing coil on said core and means to feed a biasing current to said core.

9. A circuit as defined by claim 8 wherein said biasing current feeding means comprises means to feed a continuous steady state D.C. current to said biasing coil.

10. A circuit as defined by claim 3 in which said means to feed a biasing current to said core comprises a source of D.C. current and means to connect said source to said biasing coil to direct current therethrough to normally bias said core in a negative state of remanence.

References Cited in the file of this patent

UNITED STATES PATENTS

| | | |
|---|---|---|
| 2,641,697 | Schurr | June 9, 1953 |
| 2,708,219 | Carver | May 10, 1955 |
| 2,772,357 | Wang | Nov. 27, 1956 |